United States Patent [19]

Punch et al.

[11] 4,078,576

[45] Mar. 14, 1978

[54] GAS MIXER

[75] Inventors: Gerald Punch; David Hoy, both of Newcastle-upon-Tyne, England

[73] Assignee: American Air Filter Company, Inc., Louisville, Ky.

[21] Appl. No.: 724,352

[22] Filed: Sep. 17, 1976

[51] Int. Cl.$^2$ .............................................. F16K 19/00

[52] U.S. Cl. ................................... 137/604; 98/38 B; 137/606

[58] Field of Search .................... 137/604, 606; 98/38, 98/38 A, 38 B, 38 C, 38 D, 38 E, 38 F

[56] References Cited

U.S. PATENT DOCUMENTS

| | | | |
|---|---|---|---|
| 2,880,752 | 4/1959 | Kreuttner | 98/38 C |
| 3,116,016 | 12/1963 | Joesting | 98/38 C |
| 3,386,366 | 6/1968 | Economides | 137/604 X |
| 3,405,758 | 10/1968 | Walker | 98/38 F |

*Primary Examiner*—Robert G. Nilson

[57] ABSTRACT

A gas mixer for mixing two or more gases of different quantities and physical characteristics includes a gas inlet chamber and a gas mixing chamber in gaseous communication with the gas inlet chamber. Pairs of gas inlet ducts face one another across the gas inlet chamber so that the gas streams emitting from the inlet ducts interfere causing intermingling of the gases. From the inlet chamber the gases flow downwardly into a mixing chamber. A clean air inlet duct extends across the mixing chamber. The clean air inlet duct has a longitudinal slot with a cusp shaped baffle disposed in the slot. Clean air exits the clean air inlet duct through the slot past the baffle and into the gas mixing chamber where it mixes with the gases from the inlet chamber. The mixture of gas then flows out of the mixing chamber, past rectifying vanes which change the gas flow from turbulent to laminar, and into an exhaust duct.

3 Claims, 6 Drawing Figures

GAS MIXER

This invention relates to apparatus for mixing dissimilar gas streams.

In gas extraction systems where, for example, filtering is used several gas streams from different sources may be brought together. The characteristics of these gas streams, such as flow velocity, temperature, composition, solids loading, etc., can fluctuate rapidly and over wide ranges. Most gas cleaning means are temperature sensitive to a greater or lesser extent and their operating efficiency can be impaired unless they are fed with gas which is homogenous. Thorough mixing prior to filtering is therefore necessary. Moreover, it is customary, particularly in very large installations, to supply the cleaning means through a plurality of ducts each having a respective centrifugal fan, with provision of a stand-by duct and fan to allow for servicing and mechanical breakdown. Such fans operate on their pressure/volume characteristic curves at points which are determined by the density of the gases being handled. This means that fans arranged in parallel and fed with gases which differ in composition or temperature, or both, between one machine and the next will not operate at the same point of their respective curves. Therefore, in the absence of practically complete uniformity of gas composition and temperature the fans will be unevenly loaded, resulting in power waste. Furthermore, the uneven distribution of the load will not, in general, be stable and the ducts in which they are situated will establish a form of resonance commonly known as "surging", with the resultant loss of smooth operation.

Thorough mixing of two gas streams of differing characteristics is sometimes achieved simply by merging them into a single stream at a distance sufficiently far upstream from the point at which the separation into individual streams flowing through respective fans in parallel is to occur. In this case, random turbulence, which inevitably occurs as the gases flow through the duct, ensures a thorough mixing. The distance required for adequate mixing is, in practice, influenced not only by the conveying velocity in the duct but also by the number and geometry of the changes in section and direction within the duct run. Where there are a number of streams to be mixed the combined streams formed by mixing pairs of streams must themselves be merged together in a similar manner. As a result a considerable length of duct run becomes necessary and where a limited distance is available between the first possible point of mixing and the final point by which mixing must be substantially complete it is often not possible to guarantee thorough mixing by this method.

Another and obvious method of promoting mixing is deliberately to introduce turbulence into the gas streams by means of baffles or swirl vanes which are provided in addition to the usual dampers, etc. Such methods inevitably result in a pressure loss in the gas stream which is reflected in increased fan power consumption. In one typical, large installation an increase in pressure drop of as little as 1 inch $H_2O$ gauge in a system handling a gas volume of 1,000,000 $ft.^2$ per minute resulted in an increase in fan horsepower of about 200 h.p. It is commonly found in such large systems that insufficient space is available to allow the mixing to proceed to completion where turbulence induced in the gas flow is the method used to promote the mixing. In this connection it should be noted that it is normally required to remove the turbulence before the mixture is led to the fans.

A gas mixer according to the invention, for mixing two or more separate streams of gases at least one of which may be variable in respect of the quantity of gas conveyed and the characteristics thereof, comprises a chamber having boundary walls defining a passage for gas flowing therethrough, and a flow axis, a fluid exit at one end of said chamber and fluid entries at the opposite end of said chamber with respect to said passage, said fluid entries comprising groups of ducts arranged to discharge into one or more planes normal to said axis, the ducts in the same plane being arranged in pairs such that the members of each pair are opposed, there being a damper in respect of each duct arranged at the boundary between the chamber and the respective duct, said dampers comprising one or more pivoted vanes the pivotal axes of which are substantially parallel to the direction of flow through the chamber. In use these vanes are set to create turbulence within the mixing chamber by creating a plurality of vortices having separate axes and which interfere at their boundaries. Characteristically these vortices are transient and shifting, appearing in a random manner and being influenced by the operating parameters.

In the embodiment described herein there are an odd number of gas entries and the unpaired gas stream which in this case constitutes an air bleed is fed into the mixer via a duct which enters the mixer at a different level to the paired duct and passes into and across the mixer chamber. This duct is exhausted into the mixer through apertures so positioned as to enable the unpaired gas stream to penetrate the main flow of gas from the paired ducts at right angles to its flow direction.

The gas mixer according to the invention may have any number of gas entries and these may be arranged at any number of levels to suit the convenience of ducting. The most efficient arrangement occurs when there are at least two pairs of ducts situated at each level. Unpaired ducts will be provided at different levels to the paired ducts, and may lead in the mixing chamber into branch ducts so as to achieve the most efficient mixing.

An embodiment of the invention is described hereinafter by way of example and with reference to the accompanying drawings wherein.

Figure 1:
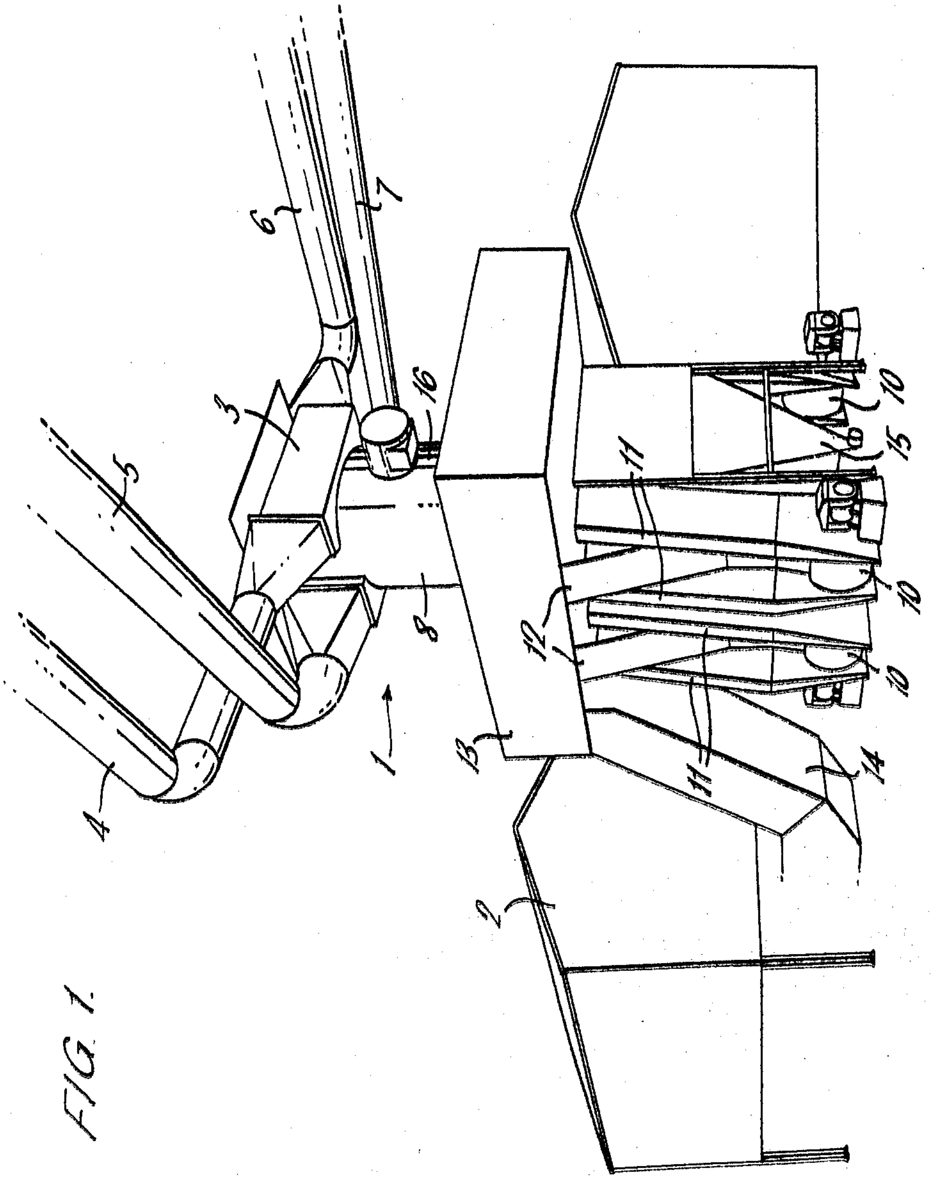
FIG. 1 is a perspective view of an industrial process air extraction system incorporating a gas mixer according to the invention.
Figure 2:
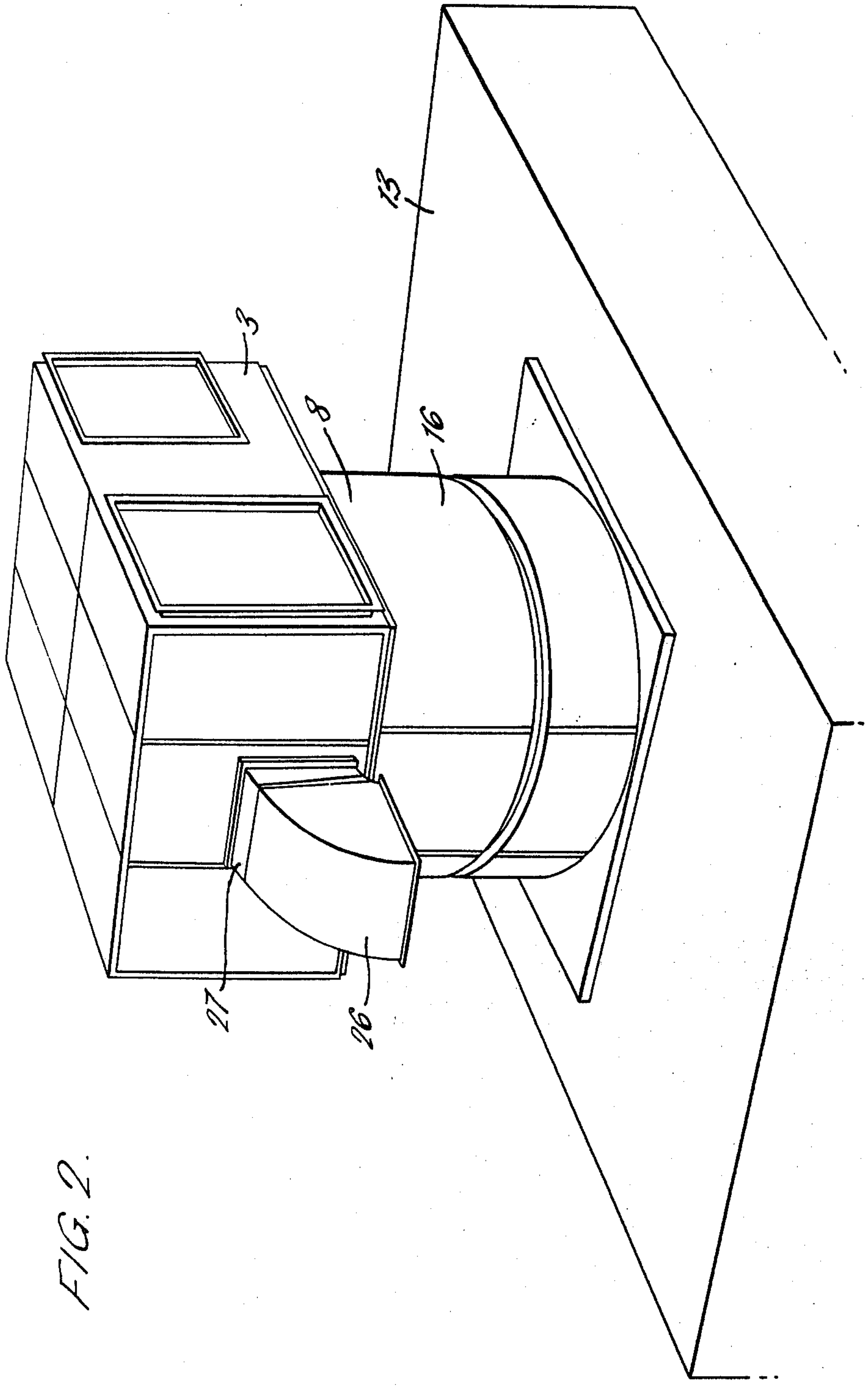
FIG. 2 is a perspective top view of a gas mixer disconnected from its inlet ducts and with the duct supporting scaffolding removed.
Figure 3:
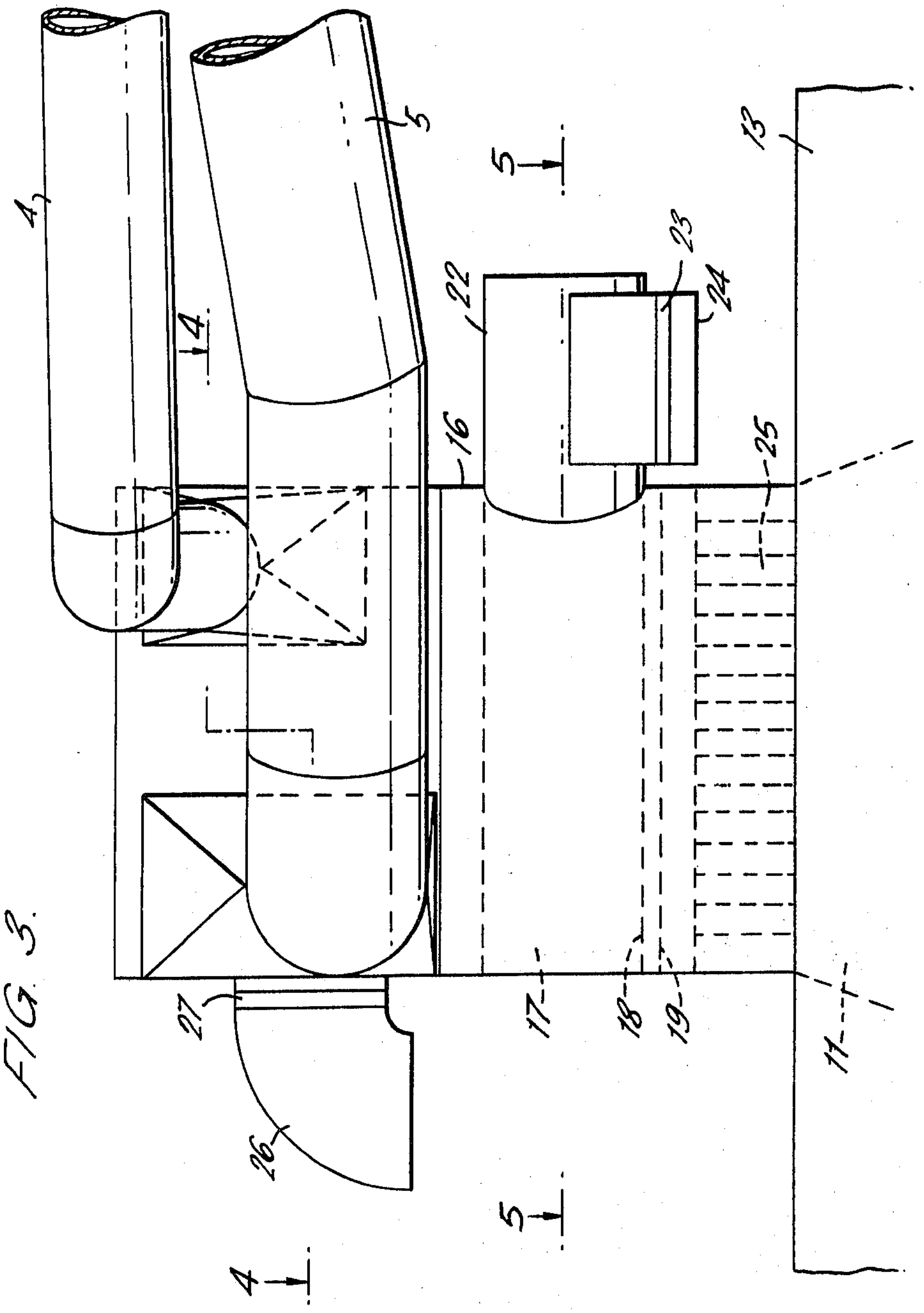
FIG. 3 is an elevation of the mixing chamber of the gas mixer.

Referring now to the drawings, a gas mixer 1 according to the invention is connected between industrial process plant (not shown) and a gas cleaning means comprising filter shed 2. The filter shed is of conventional design and is not considered further. Inlet gases from the industrial plant are led into an inlet chamber 3 of the gas mixer 1 via a plurality of ducts 4, 5, 6 and 7. In the situation where the present invention will normally be employed these ducts will contain gases of differing characteristics and the flow rates will fluctuate during the course of operation. The inlet chamber 3 forms a first part of a mixing chamber generally indicated at 8.

Inlet chamber 3 comprises a chamber having a rectangular cross-section in plan view. The inlet ducts are fed into it such that pairs of ducts substantially face one another across the width of the chamber (this is the best shown in FIG. 4). Each duct incorporates a damper 9 (see FIG. 4) at the point where the gases passing therethrough enter the inlet chamber 3. Extraction fans 10 draw the gases from the bottom of the mixing chamber 8 through exhaust ducts 11 and exhaust these gases through further ducts 12 into an exhaust plenum 13. The gases then flow from the exhaust plenum 13 through the filter inlet ducts 14 into the filter shed 2. Conventional dust collecting hoppers 15 are provided at the base of the mixing chamber 8.

Figure 6:
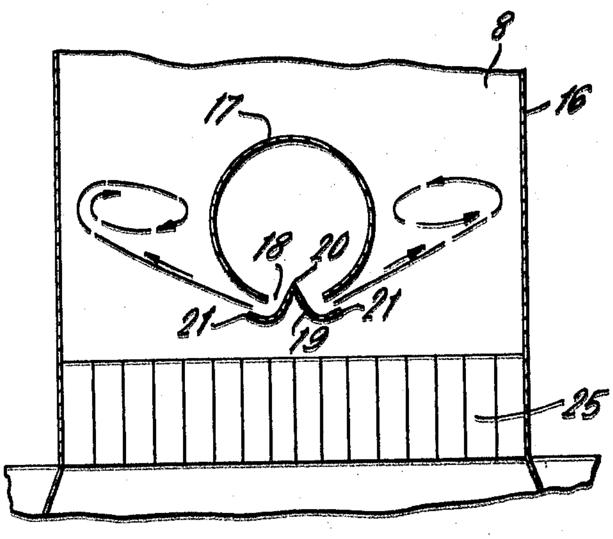
FIG. 6 is a partial diagrammatic section view of the mixing chamber in use taken along line 6—6 in FIG. 5, showing an air bleed duct.

A short vertical column 16 defining a second part of the mixing chamber 8 links the inlet chamber 3, the exhaust ducts 11 and the dust collecting hoppers 15. The gases after initial mixing in the inlet chamber 3 are drawn through this column past a further duct 17 contained therein. This further duct is arranged such that its flow axis is normal to and passes through the vertical axis of the column 16. Duct 17 has a slot 18 along its underside parallel to the flow axis thereof. A cusp-shaped baffle 19 is disposed beneath the duct 17. Baffle 19 has a longitudinal ridge 20 and flared wings 21. The ridge 20 of the baffle 19 penetrates the slot 18 thereby partially obstructing the flow through the slot. External air is drawn into the duct 17 via an external duct 22, a damper 23 and an inlet 24. As shown in FIG. 6 baffle 19 is set so that air emerging from the slot in the duct 17 is directed in the form of jets transversely and slightly upwardly into the gas stream passing down column 16. This supply of air provides a further degree of turbulence in the gases already present in the mixing chamber.

Figure 5:
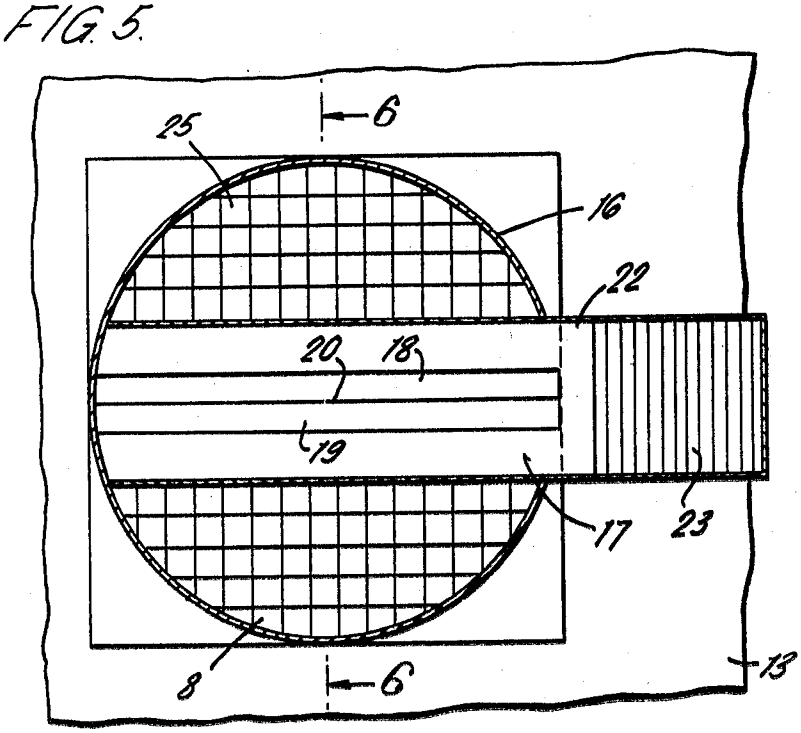
FIG. 5 is a diagrammatic plan view of the mixing chamber taken along line 5—5 of FIG. 3.

Vertical rectifying vanes 25 in the form of egg-crating or a honeycomb baffle (best shown in FIG. 5) is provided at the base of column 16. These vanes have the purpose of removing the turbulence in the gas stream so that air entering the exhaust duct 11 is substantially laminar.

An emergency air bleed duct 26 communicates with the inlet chamber 3. A normally shut damper 27 is provided in the duct 26. By opening the damper 27 a rapid and completely secure reduction of the final temperature of the gas stream in the mixer is achieved in the event of an unexpected surge of temperature therein in excess of the design specification.

In some arrangements principally where there are a large number of ducts it is convenient to bring the ducts to the mixer inlet at more than one level and there may be an unpaired duct associated with each level. The unpaired ducts, irrespective of number, may divide into a plurality of branch ducts at the entry into the mixing chamber. Moreover, in place of the aforementioned slot, there may be provided a plurality of discrete apertures the size and shape of which are weighted to provide an even distribution of the unpaired gas stream or streams across the mixing chamber.

Figure 4:
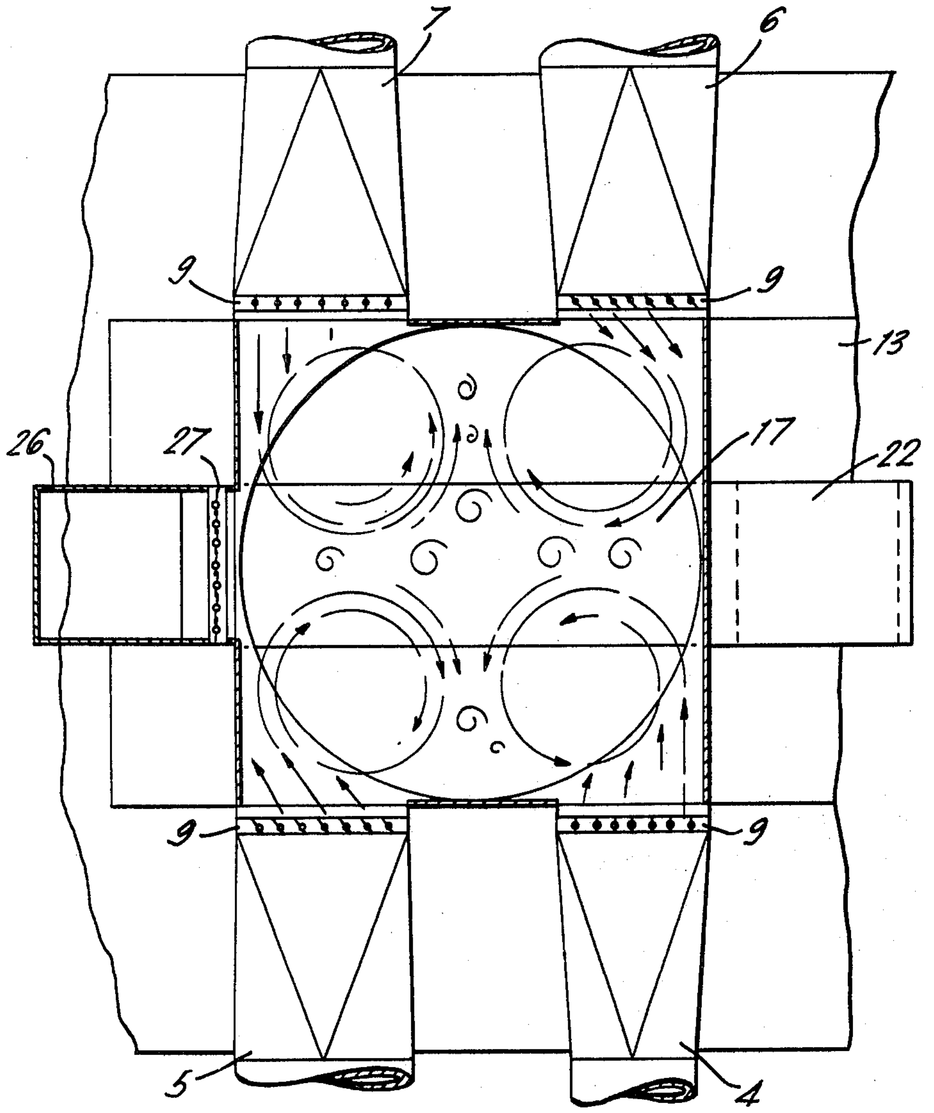
FIG. 4 is a diagrammatic sectional view of the mixing chamber in use, said view occurring along the plane indicated by the line 4—4 in FIG. 3.

In use, the dampers 9 at the entry to the inlet chamber 3 of the gas mixer are individually set to control the volume of gas entering the mixer from the respective duct. At any one time one or more of these dampers will be partially closed. Each damper is so arranged that in the partially-closed position it will impart a swirl velocity to the inlet gases, the gases swirling round axes which are parallel to the vertical axis of the mixing chamber 8. The vortices formed thereby are such that they mutually interfere with one another at their boundaries thereby causing intermingling of the gas streams to occur. This is best shown in FIGS. 4 and 6 wherein it is presumed that the gases emerging from the ducts 4, 5, 6 and 7 are heavily charged with smoke. Controlled quantities of clean air are admitted to the mixing chamber 8 via the duct 17 in order to provide dilution, temperature control, and further turbulences having changed swirl axes thereby causing the maximum intermingling.

Because each duct has its own damper at the mixer inlet the system dispenses with other more conventionally positioned dampers. Thus the underlying principle of the system is that the energy contained in the gas streams being throttled at any time in accordance with the extraction needs of the four distinct sources served by the system is utilized to stir the other, unthrottled streams and thereby cause thorough mixing with the minimum pressure drop through the system.

The opposition of the ducts is normally sufficient to guarantee thorough mixing with a considerable saving in running costs due to the utilization of the throttling vanes to promote the mixing within the apparatus.

We claim:

1. A gas mixer for mixing two or more separate streams of gases at least one of which may be variable in respect of the quantity of gas conveyed and the characteristics thereof, comprising a chamber having boundary walls defining a passage for gas flowing therethrough and a flow axis, a fluid exit at one end of said chamber and fluid entries at the opposite end of said chamber with respect to said passage, said fluid entries comprising groups of ducts arranged to discharge into one or more planes normal to said axis, the ducts in the same plane being arranged in pairs such that the members of each pair are opposed, there being a damper in respect of each duct arranged at the boundary between the chamber and the respective duct, said dampers comprising one or more pivoted vanes the pivotal axes of which are substantially parallel to the direction of flow through the chamber, and any unpaired gas stream is fed into one or more ducts passing into the chamber in a parallel but different plane to the plane or planes containing the paired ducts, said ducts being apertured in such positions so as to enable the unpaired gas stream to enter the gas passing through the chamber along the said flow axis substantially normal to the main flow of gas from the paired ducts.

2. A gas mixer according to claim 1 wherein the or each duct conveying the unpaired gas stream co-operates with a respective cusp-shaped baffle provided in said chamber and wherein the aperture of the said duct or ducts comprises a slot arranged along the length of the underside of the said duct with respect to the process gas entries, parallel to the flow axis of the duct, said baffle, or baffles, having a ridge defining the apex of said cusp shape which is entered into the respective slot and wing portions which guide gas emerging from said slot into the main flow of gas from the paired ducts.

3. A gas mixer according to claim 1 wherein the said duct, or ducts, has one or more apertures the size and shape of which are weighted so as to distribute the flow of the unpaired gas stream evenly across the chamber.

* * * * *